(No Model.)
V. WOOD.
HARROW ATTACHMENT FOR PLOWS.
No. 331,358. Patented Dec. 1, 1885.
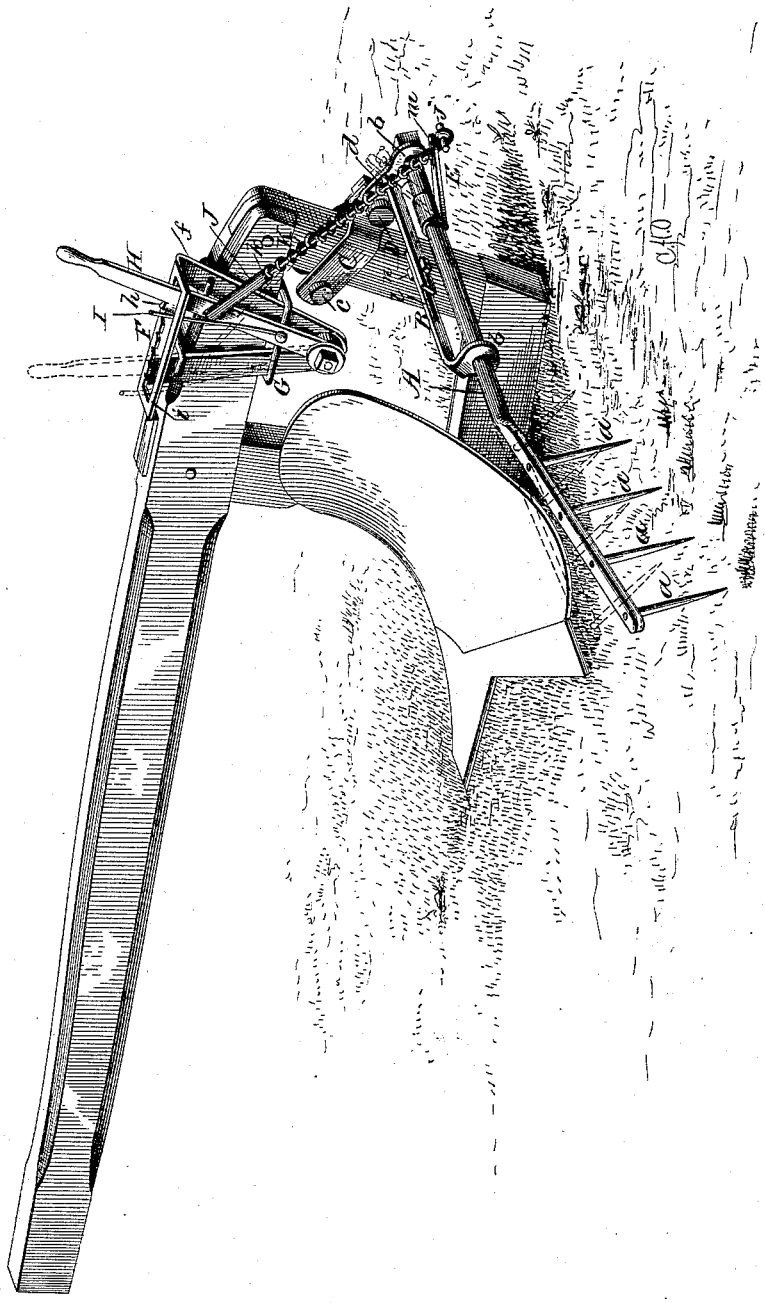
WITNESSES
F. L. Ourand
L. L. Miller
INVENTOR
Valentine Wood,
per Chas. H. Fowler
Attorney

UNITED STATES PATENT OFFICE.

VALENTINE WOOD, OF PERU, INDIANA.

HARROW ATTACHMENT FOR PLOWS.

SPECIFICATION forming part of Letters Patent No. 331,358, dated December 1, 1885.

Application filed February 28, 1885. Serial No. 157,402. (No model.)

*To all whom it may concern:*

Be it known that I, VALENTINE WOOD, a citizen of the United States, residing at the city of Peru, in the county of Miami and State of Indiana, have invented certain new and useful Improvements in Harrow Attachments for Plows; and I do hereby declare that the following is a full, clear, and exact description of the same, reference being had to the annexed drawings, making a part of this specification, and to the letters and figures of reference marked thereon.

My invention is an improvement in that class of plow attachments which is connected with the breaking-up or furrowing plow, and pulverizes the soil as it is turned up by such plow.

The invention aims to provide a toothed bar suitably journaled, so it may be conveniently turned up out of operative position when not in use. It further aims to so journal the toothed bar and combine it with a tension-spring that said bar, when it engages a stone or unusually hard or stiff piece of soil will ride over the same, and yet assume and be held in operative position when said obstruction has been passed. It also aims to so form the several parts that the attachment may be conveniently applied to and removed from a plow at will. It also aims to provide other improvements, as will be described.

The invention consists in certain details of construction, which will be hereinafter first fully described, and subsequently pointed out in the claims.

In the accompanying drawings I have shown in perspective my improved attachment in place on a plow. The plow may be of any desired variety. The toothed bar A is provided on one end with the teeth *a*, which are inclined outwardly and to the rear. The end or portion of the bar on which the teeth are supported is bent at a slight angle to the other or inner portion of the bar at the junction of said toothed and inner portions. As shown, the inner portion of the bar is journaled in suitable supports, and by bending the outer portion such portion when the bar is turned as shown will rest in approximately a horizontal line, yet when the bar is turned as presently described the toothed portion will project up at an angle, and will better clear the soil turned up by the plow. For this reason it is preferred to form the bar with the angle as described. The inner end of the toothed bar is journaled in a bearing-frame which comprises a base or main plate, B, and lugs *b*, which form bearings for the toothed bar. This bearing-frame is provided at one end with a clamp, C, which embraces an upright of the plow, and has a bolt, *c*, by loosening which the clamp and bearing-frame may be set higher or lower, as desired. I prefer to connect the bearing-frame with the clamp C by a pivot-bolt, D, so the said frame may be adjusted independently of the clamp and held at any point by tightening the nut on the bolt D. In carrying out this construction the bearing-frame has fixed to it a lug, *d*, which extends alongside the clamp and is secured by bolt D. On the inner end of the toothed bar I secure or form a crank, E. This crank might be extended and serve as a handle, by which the plowman could hold the toothed bar by hand and turn such bar out of operative position whenever occasion required. I prefer, however, to operate such bar automatically by the devices hereinafter described. A rack, F, is secured to the plow in advance of the toothed bar. It is preferred to form this rack in a frame, *f*, which is secured by clips G, or in other suitable manner, to the beam. To the lower end of this frame I pivot a lever, H, which extends alongside of and has a point, *h*, arranged to engage the rack F. A spring, I, is secured to the side of the lever, and bears against a bar, *i*, supported in frame *f*. This spring serves to hold the lever in engagement with the rack, and yet permits its disengagement when desired to set the lever to different points.

To the lever H is connected one end of a rod, J, the other end of which extends rearwardly through an opening in the crank E, and has a pin, *j*, or other suitable enlargement on its end, whereby the crank is held on the said rod. A coil-spring, K, is placed on the rod J, and bears between the crank and a shoulder, *k*, on the rod J, thus holding the crank normally at the end of the rod J, as shown.

When the parts are in the position shown in full lines in the drawings, the teeth will engage in and pulverize the soil turned by the plow. Should a rock or other obstruction be engaged by the teeth, they will turn and the crank E move forward on rod J, as indicated in dotted lines; but when passed the spring will force the toothed bar again into operative position.

By means of the lever and the rack the rod may be adjusted out of the ground whenever desired, as when rounding a stump, turning at the end of the field, or moving from the barn to the field.

My attachment is shown applied to a left-hand plow; but it will be understood nothing more than slight mechanical alterations would be required to adapt the invention to a right-hand plow.

While I prefer the construction as shown, it is manifest many alterations might be made in form and arrangement without departing from the invention. The spring K might be used in connection with the crank E independently of the lever H, in which case one end of the said spring would be caused to engage the crank and the other a suitable support, which might be the plow-framing or the bearing-frame. It will also be understood that a flat or bar spring might be substituted for the coil one, and that such a change would be within the bounds of my invention.

My invention is alike applicable to walking or sulky plows. The plate B, I prefer to make in sections, one of which is provided with an elongated slot $l$, and by means of the set-screw $n$ the plate can be lengthened or shortened to suit the width of the plow between the landside and point of mold-board, and held in its adjusted position by the set-screw. The crank E is preferably formed with an elongated slot, $m$, through which the end of the rod J extends to allow of its free movement, and, if desired, a nut may be substituted for the shoulder $k$, so that the tension of the spring may be regulated.

Having thus described my invention, what I claim, and desire to secure by Letters Patent, is—

1. The combination of the plow provided with a rack, a toothed bar journaled to the plow and provided with a crank, a lever arranged to engage the rack, and a rod connecting said lever with the crank, substantially as set forth.

2. The combination, in a plow attachment, of a rack, a lever arranged to engage such rack, a bearing-frame, a toothed bar journaled in said frame and provided with a crank, a rod secured at one end to the lever and projected at its other end through the crank, and a spring engaging said crank, whereby the toothed bar is held normally in operative position, substantially as set forth.

3. The combination, with a plow, of a laterally-adjustable frame, vertically adjustably secured to the stock of the plow-beam, a bar journaled in said frame and provided with teeth on its outer end and a crank on its inner end, a rack and lever, a pitman connecting the lever and the crank of the tooth-bar, and a spring coiled around the pitman and bearing on the crank, the parts being arranged and operating substantially as shown and described.

In testimony that I claim the above I have hereunto subscribed my name in the presence of two witnesses.

VALENTINE WOOD.

Witnesses:
 JAMES M. BROWN,
 NOTT N. ANTRIM.